(12) United States Patent
Helms (10) Patent No.: US 6,209,215 B1
(45) Date of Patent: Apr. 3, 2001

(54) SADDLE JOINT CONTOUR GAUGE APPARATUS AND METHOD

(76) Inventor: Steven W. Helms, 17414 Interurban Blvd., Snohomish, WA (US) 98296

( * ) Notice: Subject to any disclaimer, the term of this patent is extended or adjusted under 35 U.S.C. 154(b) by 0 days.

(21) Appl. No.: 09/137,805

(22) Filed: Aug. 20, 1998

Related U.S. Application Data

(60) Provisional application No. 60/056,208, filed on Aug. 21, 1997.

(51) Int. Cl.$^7$ ..................................................... G01B 5/20
(52) U.S. Cl. ............................ 33/529; 33/561.1; 33/561.2
(58) Field of Search ........................... 33/412, 529, 561.1

(56) References Cited

U.S. PATENT DOCUMENTS

| | | | |
|---|---|---|---|
| 776,713 | 12/1904 | Wurts | 33/529 |
| 1,535,980 | * 4/1925 | Campbell et al. | 33/561.2 |
| 1,568,876 | * 1/1926 | Campbell et al. | 33/561.2 |
| 2,155,705 | * 4/1939 | Gottwald | 269/2 |
| 2,222,127 | 11/1940 | Turner | 33/529 |
| 2,380,919 | 8/1945 | Bugennagen | 33/529 |
| 2,466,464 | 5/1949 | Moore | 33/529 |
| 2,533,500 | 12/1950 | Parsons | 33/529 |
| 2,615,255 | 10/1952 | Rankin | 33/529 |
| 2,671,273 | 3/1954 | Barnes | 33/529 |
| 2,742,706 | 4/1956 | Rushing | 33/529 |
| 3,419,965 | 1/1969 | Madden | 33/561 |
| 3,550,278 | 12/1970 | Pruett | 33/529 |
| 3,983,632 | 10/1976 | Halstead | 33/561.1 |
| 4,103,428 | * 8/1978 | Guzick | 33/645 |
| 4,419,828 | 12/1983 | Farris | 33/529 |
| 4,807,369 | 2/1989 | Ming-Chin | 33/529 |
| 5,383,282 | 1/1995 | Field et al. | 33/529 |

* cited by examiner

Primary Examiner—Christopher W. Fulton
Assistant Examiner—Quyen Doan
(74) Attorney, Agent, or Firm—William G. Forster (57) ABSTRACT

The present invention pertains to a contour gauge for use in the fabrication of saddle joints in pipe connections to record and reproduce the projected line of continuous contact between the end of a first pipe intersecting the side of a transversely disposed second pipe so that the same can be accurately cut, and then joined/welded together in end-to-side relationship. The contour gauge comprises a cylindrical frame having a centrally disposed bore that defines a radially inner surface for positioning the frame over a pipe of predetermined size. In addition, the frame has a radially disposed outer surface that comprises a plurality of parallel guide channels that are disposed side-by-side to extend in a direction parallel to the longitudinal axis of the frame. In the present invention, the guide channels are shaped in the form of grooves. Disposed about the radially outer surface is a plurality of elongate rods, the rods being aligned parallel with the longitudinal axis of the frame such that each rod is slidingly received by one of the parallel guide channels. Further, in order to maintain the rods within the guide channels, a biasing member is circumferentially disposed around the frame, over the rods. The biasing member contacting the rods to impart a radially inward directed force on each rod to urge the same against the frame.

10 Claims, 7 Drawing Sheets

SADDLE JOINT CONTOUR GAUGE APPARATUS AND METHOD

This application claims the benefit of U.S. Provisional Application No. 60/056,208 filed Aug. 21, 1997.

The present invention pertains to the fabrication of saddle joints for joining two pipes, and more particularly to a contour gauge for use in the precise preparation of pipes for such joints.

BACKGROUND

Contour replicating devices for preparation of pipes to be joined by a saddle joint are well known in the art. Many of the early designs intended for this purpose incorporated a plurality of rods mounted to a member that encircles a pipe. For example Wurts' U.S. Pat. No. 776,713 discloses a flexible band adapted to be opened and included series of adjustable rods mounted thereon. Similarly, Turner's U.S. Pat. No. 2,222,127 discloses a retainer ring made of link elements pivotally interconnected wherein each link member includes a movable indicator.

Several other early designs include mechanisms that grip or are connected to the contour measuring device to hold the same in place. For example Bugenhagen's U.S. Pat. No. 2,380,919 discloses a conformator gauge supported from a hinged arm that extends from a supporting base. Moore's U.S. Pat. No. 2,466,464 discloses a guide head having stepped plates that are movable on a centrally disposed centering member that is held in place by an arm having a slidable clamp. Similarly, U.S. Pat. Nos. 2,533,500; 2,615, 255; and 2,615,255 issued respectively to Parsons, Rankin and Rushing disclose contour gauges that in one way or another have a positive connection to one of the pipes being measured.

A few of the later designs were directed to contour gauges that could adjust in a way to accommodated pipes and structures of various sizes and diameters. For example Barnes U.S. Pat. No. 2,671,273 discloses a plurality of pins that project through a readily deformable band. Madden's U.S. Pat. No. 3,419,965 discloses a profile transferring device having a plurality of gauge units that connect together to form a long chain to follow long contours. Pruett's U.S. Pat. No. 3,550,278 discloses a pipe intersection marker having a a plurality of wedge shaped ribs attached to a belt that is adjustable in length.

Other recent designs include Halstead's U.S. Pat. No. 3,983,632 which discloses a contour transfer device including a pair of bars shaped and clamped together having a row of finger receiving openings through which transfer fingers are slideably mounted. Farris' U.S. Pat. No. 4,419,828 discloses a tubular pantograph mechanism that is adjustable in diameter, and has circumferentially spaced elongated rods mounted on the inner wall in parallel relation with the axis. Ming-Chin's U.S. Pat. No. 4,807,369 patent discloses a development drafter having a flexible strip that includes a plurality of integrally formed parallel tubular pin holders disposed to receive a plurality of pins wherein the flexible strip is adaptable to wrap around a pipe. Similarly, U.S. Pat. No. 5,383,282 by Field et al discloses a plurality of pins held in a flexible band that is capable of circumferentially enclosing a tube. As can be seen, many variations of contour gauge designs have been introduced over the years.

While most the above noted contour reproducing devices adequately perform the task of duplicating the line of an irregular surface, each are to some extent either complicated in design, difficult to use, expensive to manufacture, or produce imprecise results. Accordingly, a need remains for a contour gauge that produces accurate results yet is simple in construction, easy to use, and inexpensive.

SUMMARY

One object of the present invention is to facilitate the joining of a first pipe to the side of a transversely disposed second pipe.

A second object is to reduce the time required to form a saddle joint between two pipes.

Another object is to reduce wasted material that results from having to repair poorly formed saddle joints between pipes.

Yet another object is to increase the reliability of the saddle joint formed between two pipes.

A further object is to enable one person to more readily form a saddle joint.

Still another object is to reduce the man-hours spent on forming a saddle joint.

The invention is an improved contour gauge for use in the fabrication of saddle joints in pipe connections. The contour gauge is employed to record and reproduce the projected line of continuous contact between the end of a first pipe intersecting the side of a transversely disposed second pipe. The contour gauge is provided for configuring and marking the pipes so that the same can be accurately cut, and then joined/welded together in end-to-side relationship. The contour gauge comprises a cylindrical frame having a centrally disposed bore that defines a radially inner surface for positioning the frame over a pipe of predetermined size. In addition, the frame has a radially disposed outer surface that comprises a plurality of parallel guide channels that are disposed side-by-side to extend in a direction parallel to the longitudinal axis of the frame. In the present invention, the guide channels are shaped in the form of grooves.

Disposed about the radially outer surface is a plurality of elongate rods, the rods being aligned parallel with the longitudinal axis of the frame such that each rod is slidingly received by one of the parallel guide channels.

Further, in order to maintain the rods within the guide channels and to provide friction for a controlled sliding action, a biasing member is circumferentially disposed around the frame, over the rods. The biasing member contacting the rods to impart a radially inward directed force on each rod to urge the same against the frame. Thus each rod is biased toward a respective guide channel wherein the rods can slide independently to follow the contour of a pipe.

The foregoing and other objects, features, and advantages of this invention will become more readily apparent from the following detailed description of a preferred embodiment which proceeds with reference to the accompanying drawings, wherein the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF PREFERRED EMBODIMENT

Figures 1, 2:
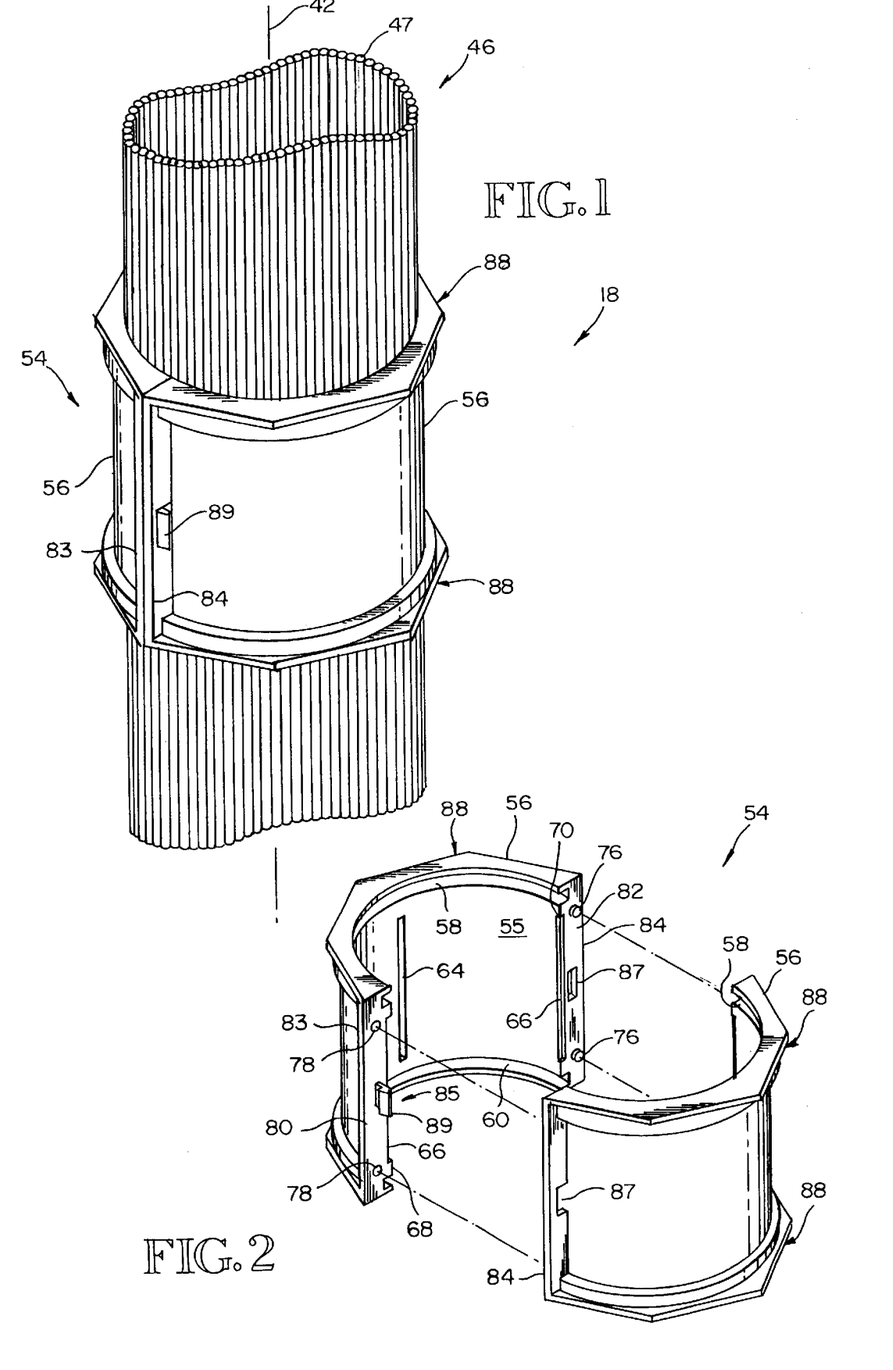
FIG. 1 is a perspective view of a fully assembled contour gauge constructed in accordance with the present invention with the outer retainer disposed over the rods.
FIG. 2 is an exploded perspective view of an outer retainer comprising two retainer sections that mate to form the outer retainer.
Figures 3, 3A:
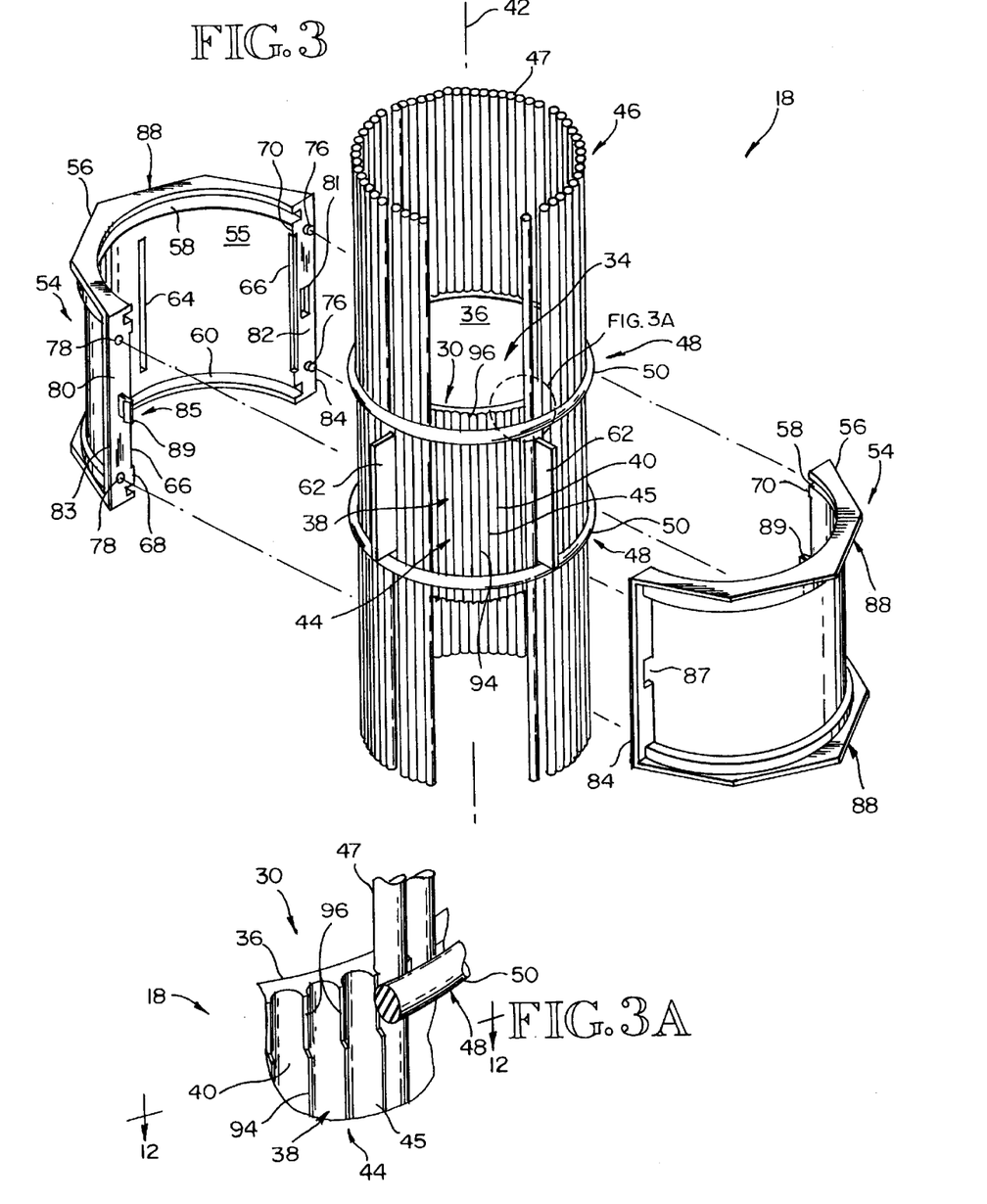
FIG. 3 is an exploded perspective view of a contour gauge illustrating a plurality of rods being biased against the guide channels of the outer surface of a cylindrical frame by a pair of o-rings, with some rods removed to show the guide channels of a preferred embodiment, wherein the guide channels are constructed as semi-circular grooves.
FIG. 3A is a fragmentary perspective view showing an o-ring biasing rods against the frame within corresponding grooves wherein a portion of the ridge, at the o-ring, is notched to allow the o-ring to make positive contact with the rods to radially urge them against the frame.
Figure 4:
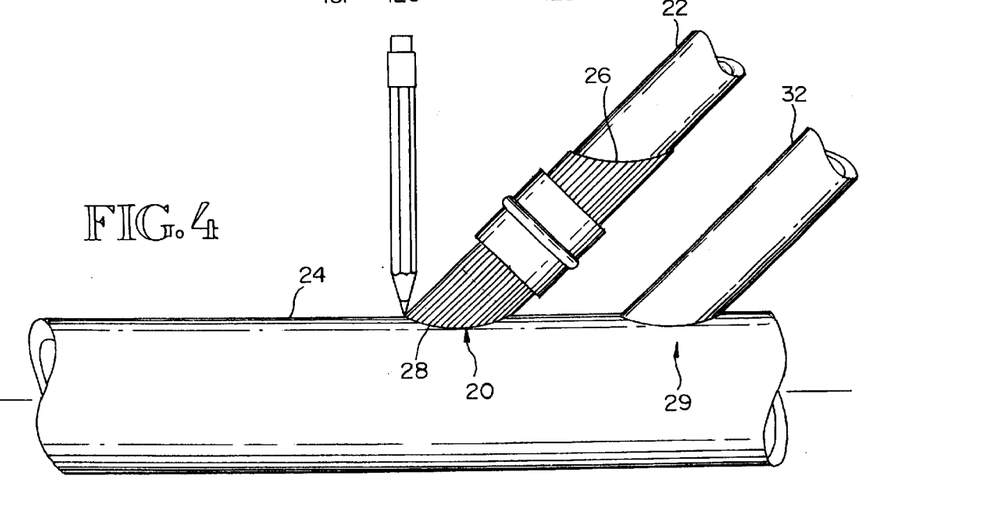
FIG. 4 is a elevational view of a contour gauge disposed over a round pipe aligned to intersect a transversely disposed larger pipe, the pencil denoting marking the projected points of intersection, and a second attached pipe illustrating a finished saddle joint.

FIGS. 1 through 3 show a preferred embodiment saddle joint contour gauge constructed in accordance with the present invention. The contour gauge is hereinafter referred to as contour gauge 18. As illustrated in FIG. 4, the contour gauge 18 is provided for recording and reproducing the projected line of continuous contact 20 between the end of a first pipe 22 intersecting the side of a transversely disposed second pipe 24 of larger diameter. For this purpose, the contour gauge 18 is employed to indicate the proper cutting line, e.g., line 26 on pipe 22 and line 28 on pipe 24 for the same to be accurately cut, and then joined and welded together in end-to-side relationship as indicated by pipe 32 attached to pipe 24 wherein the connection is commonly referred to as a saddle joint 29.

To this end, the preferred embodiment contour gauge 18 comprises a cylindrical frame 30 having a centrally disposed bore 34 that defines a radially inner surface 36 for positioning the frame 30 over a pipe of predetermined size. The frame 30 includes a radially disposed outer surface 38 that comprises a plurality of parallel guide channels 40 disposed side-by-side to extend in a direction parallel to the longitudinal axis 42 of the frame 30. As will be more fully discussed below, the guide channels 40 of the preferred embodiment are constructed alike as "semi-circular" (FIG. 12) and denoted collectively as grooves 44. Individually, each groove is referred to as groove 45 and is sized to receive one individual rod 47 of a plurality of alike circular rods collectively referred to as rods 46. Each individual rod 47 is shaped to fit within an individual groove 45 and is typically constructed of stainless steel.

In this way, a plurality of elongate rods 46 can be placed about the radially outer surface 38, aligned with the longitudinal axis 42 of the frame 30 such that each individual rod 47 is slidingly received by one of said parallel guide channels 40, i.e., by one individual groove 45. In order to hold the rods 46 in place and to provide friction for a controlled sliding action, the same are biased against the outer surface 38. More specifically, each rod 47 is held in it its respective groove by a biasing member 48 that is circumferentially disposed around the frame 30, over the rods 46. Thus, the biasing member 48 contacts the rods 46 to impart a radially inward directed force thereon to urge the plurality of rods 46 against the frame 30: each individual rod 47 being biased against a respective groove 45.

Directing attention to FIGS. 1 through 3A a preferred embodiment is illustrated. Therein a plurality of rods 46 are slidingly received within grooves 44. The rods 46 are held in position by a pair of biasing members 48 which, in the preferred embodiment, are a pair of endless rings made from elastic more commonly referred to as o-rings, i.e., o-rings 50 (FIG. 3). In order for the o-rings 50 to bias the rods 40 against the grooves 44 of the outer surface 30, the o-rings are sized so that stretching is required when they are placed over the rods 46.

As best viewed in FIG. 3 the o-rings are disposed over the rods 46, within the length of the frame 30. To maintain the o-rings 50 in this position, an outer retainer 54 is placed thereover. In the preferred embodiment, the outer retainer 54 is constructed from two identical, molded plastic components where each is referred to as a retainer section 56. To facilitate a close fit between the retainer sections 56 and the rods 46, a pair of o-ring grooves 58 and 60 are molded into each retainer section 56, of a size to snugly receive and engage the o-rings 50. In fact, the o-ring grooves 58–60 could be slightly under sized to increase the tightness of fit between each retainer section 56 over the o-rings 50. In this way, each retainer section 56 could apply additional pressure between each biasing member 48 and the rods 46. The o-ring grooves 58–60 also serve to confine the movement of the o-rings in relation to the frame 30 as the rods 46 move responsive to engaging a pipe or other object when the user employs the contour gauge 18 to determine cutting lines 26–28.

Additionally, as will be more fully explained below, the movement of the outer retainer 54 is restricted in relation to the frame 30 and o-rings 50. In this way, only the rods 46 move relative to the outer retainer 54, the o-rings 50 and the frame 30. This feature allows the user to move the frame 30 along a pipe by gripping the outer retainer 54. When the outer retainer 54 is so moved, the rods 46 shift relative to the frame 30 as the rods 46 engage a transversely disposed pipe as illustrated in FIG.4.

To restrict the relative movement between the frame 30 and the outer retainer 54, the preferred embodiment frame 30 includes four identical retaining lugs 62 that extend radially outward from the frame 30. The retaining lugs 62 are equally spaced about the frame 30, i.e., each is 90 degrees apart around the frame 30, wherein each retaining lug 62 is disposed approximately half way between the ends of the frame 30. The retaining lugs 62 can be attached to the frame 30 in any conventional manner including welding as well as forming the same integrally.

The retaining lugs 62 are disposed to engage a respective cavity formed on the inner surface 55 of the outer retainer 54. For this purpose, a centrally disposed central cavity 64 is so formed in each retainer section 56. The central cavity 64 extends below the inner surface 55 to a depth sufficient to fully receive a retaining lug 62 therein. In particular, the central cavity 64 is of a sufficient width and length to accommodate the thickness and length of the retaining lug 62.

Similarly, two "half width" edge cavities 66 are so formed: one adjacent each longitudinal edge 68–70 of each retainer section 56. It should be understood that each edge cavity 66 is half the width of a central cavity 64 so that when opposing retainer sections 56 are mated or joined around frame 30, the opposing edge cavities 66 of opposing retainer sections 56 come respectively together to form a cavity of sufficient width to securely receive a retaining lug 62 having a corresponding thickness.

In addition, like the central cavity 64, each edge cavity 66 extends radially to a sufficient depth from a longitudinal edge to fully receive a retaining lug 62. Thus, in each assembled outer retainer 54, each retaining lug 62 is securely received into a cavity thereby restricting relative movement between the frame 30 and the outer retainer 54.

Importantly, as noted above, in the preferred embodiment the four retaining lugs 62 are spaced equally about the outer surface 38 of frame 30, and centered between the opposing ends thereof. Similarly, the central cavity 64 and each edge cavity 66 are disposed to receive a respective retaining lug 62. Moreover, it should be understood that the above noted arrangement and location of the central cavity 64 and each edge cavity 66 of each retainer section 56 enables the retaining lugs 62, of a frame 30, to be received directly therein. In particular, one retaining lug 62 is received into the central cavity 64 of one retainer section 56, while two other retaining lugs 62, disposed to either side, are received into opposing edge cavities 66.

To facilitate a proper fit between opposing retainer sections, each identical retainer section 56 includes a pair of pins 76 and a pair of corresponding receiving bores 78 as best illustrated in FIGS. 2 and 3. Specifically, mating surface 80 includes two spaced-apart receiving bores 78, and mating surface 82 includes two spaced-apart mating pins 76. Importantly, the receiving bores 78 are disposed to receive a corresponding pin 76 as the opposing retainer sections are brought together around the frame 30.

Further, the pins and receiving bores are located on the mating surfaces 80–82 of each identical retainer section 56 such that two identical retainer sections fit together by inverting one retainer section relative to the opposing retainer section, i.e., by rotating one retainer section 56 by 180 degrees to the other retainer section 56. In this way, pins disposed on mating surface 82 of one retainer section 56 fit into the receiving bores disposed on mating surface 80 of the other opposing retainer section 56 and visa versa as best illustrated in FIGS. 2 and 3. Accordingly, as illustrated in FIGS. 1 and 2, as each opposing retainer section 56 of an outer retainer 54 is properly positioned around a frame 30, the mating surface 80 of each retainer section 56 comes together with the corresponding mating surface 82 of the opposing retainer section 56.

As previously indicated, this Patent Application claims the benefit of U.S. Provisional Application No. 60/056,208 filed Aug. 21, 1997. In the Provisional Application, the preferred embodiment for each alike retainer section 56 includes two welding tabs 86. Welding tabs were provided so that opposing retainer sections could be fixed together by welding the opposing welding tabs together after the retainer sections are brought together around the frame 30.

However, the preferred embodiment of the present invention employs an improved connection. In the present invention, each identical retainer section 56 is constructed so that a pair of opposing retainer sections can "snap" together around a frame 30. Specifically each mating surface 80–82 is constructed to define a flange 83–84 that extends radially from the retainer section 56. Further, flange 83 is constructed to include a barbed post 85, and flange 84 is constructed to include a barb receiving aperture 87. In this way, the two identical opposing retainer sections can be oriented 180 degrees such that the barbed post 85 and the barb receiving aperture 87 of one retainer section are respectively aligned with the barb receiving aperture 87 and barbed post 85 of an opposing retainer section. When the retainer sections are so aligned over a frame having rods held in place by o-rings, the retainer sections can be "snapped" together around the frame so that the barb 89 of each barbed post 85 respectively engages, i.e., penetrates a barb receiving aperture 87.

Moreover, an important characteristic of the barbed post 85 is that the barb 89 thereon is disposed so that the barbed post 85 must slightly deform as the barb 89 engages the barb receiving aperture 87. In this way, the barbed post 85 snaps back into place just as the barb 89 completely passes through the barb receiving aperture thereby preventing the barb 89 from backing out of the barb receiving aperture 87. Accordingly, to separate two "joined" retainer sections, a user can urge barb 89 transversely in relation to the barb receiving aperture 87 such that barb 89 clears the same wherein the user can then separate the retainer sections.

Figure 12:
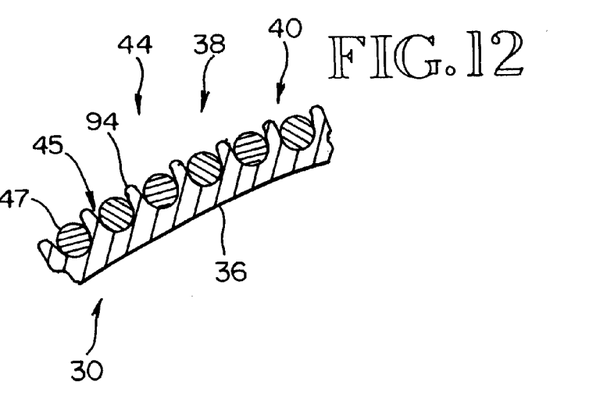
FIG. 12 is a fragmentary sectional view of a frame taken along line 12—12 (FIG. 3A) illustrating the semicircular shape of the grooves, wherein the extension of the ridge of the groove extends radially outward at least as far as the outer portion of the rod.

Regarding the materials employed in the construction of a preferred embodiment contour gauge 18, the frame 30 is made from aluminum and is extruded to form the grooves 44 of the outer surface 38. In the preferred embodiment, the guide channels 40 are shaped in the form of grooves 44 that are semi-circular in cross-section as best illustrated in FIG. 12. This is so because (1) the semi circular shape is particularly suited for the extrusion process and (2) because the rods 46 in the preferred embodiment are round. However, other configurations for guide channels 40 could be substituted for the grooves 44 of the preferred embodiment. For example, any type of projection extending outward from the outer surface 28 of the frame 30 disposed to maintain the rods 46 in side-by-side relationship, parallel to the longitudinal axis 42 would perform adequately and accordingly be acceptable. Beyond this, the inner surface 36 of the frame 30 is typically smooth following the extrusion process for ease of fit over a round pipe. Further, like the frame 30, the rods 46 are alike and made of metal, typically stainless steel.

Importantly, as illustrated in FIG. 12, it should be noted that in the preferred embodiment each groove 45 is formed having a depth sufficient to provide that no portion of the rod extends outward from and/or beyond the groove, i.e., all portions of a rod 47 are disposed entirely within the groove. Accordingly, the common ridge 94 formed between two adjacent grooves extends slightly beyond a rod 47 disposed therein. The reason for this construction is that the manufacturing process of frame 30 is more easily accomplished with grooves that have ridges that extend radially at least as far out from the frame as the rods. In this way, the frames 30 tend to be stiffer during the extrusion process thereby causing less deformation as the frame 30 cools to room temperature.

Because the preferred embodiment employs grooves as noted above, a portion of each common ridge 94 must be removed to provide a notched ridge 96 so that an o-ring 50 can contact and urge the rods 46 against the frame 30. As illustrated in FIG. 3A, a portion of each common ridge 94 is notched so that each rod 47 extends beyond its respective groove to contact the o-ring. Additionally, it should be noted that the above noted "notching" occurs at each end of the frame, i.e., for each o-ring.

Additionally, the outer retainer 54 of the preferred embodiment is made from plastic, and the o-rings 50 are made from an elastic stretchable material. The outer retainer 54 being molded and produced in two sections, where as each retainer section 54 is identical in construction. In this way production costs are kept to a minimum due to the fact that fewer molds and dies are required. In addition, plastic molded construction of the outer retainer 54 accommodates the formation of the o-ring grooves 58–60, each pin 76, and a receiving bore 78, and each barbed post 85. It should also be noted that opposing ends of the outer retainer 54 are molded to form an octagon shaped flange 88. Flange 88 is so formed to prevent the contour gauge 18 from rolling when placed on smooth surfaces (not illustrated), and for pipe layout.

Turning now to FIGS. 7 through 10, an alternate embodiment is illustrated. Included therein is a pair of identical circular opposing removable retainer sleeves 100 that fit over a frame 102. The frame 102 is constructed similarly to frame 30 in that it defines a bore 103 and includes a plurality of grooves 104 provided on the outer surface 106 thereof. The grooves 104 are disposed parallel to the longitudinal axis 108, and are semi-circular in shape to receive a plurality of rods 110. In this embodiment, a single o-ring 112 is employed as a biasing member centrally disposed around the rods 110 to bias the same to the frame 102.

To maintain the retainer sleeves 100 in proper position around the frame 102, four pairs of spaced-apart retaining lugs 116a and 116b are provided to engage the retaining sleeves: retaining lugs 116a being disposed toward one end of frame 102, and retaining lugs 116b being disposed toward the opposite end thereof. Each pair of retaining lugs is equally spaced about the outer surface 106 of frame 102 by 90 degrees, similar to retaining lugs of the preferred embodiment. With this configuration, each opposing retainer sleeve 100 engages four retaining lugs.

Specifically, retaining lugs 116a engage one retainer sleeve while retaining lugs 116b engage the opposing retainer sleeve. For this purpose, each retainer sleeve 100 is constructed with a radially inner surface 113 having a recess 114 disposed at one end of the retainer sleeve 100, four radially disposed locking channels 118, and four guide channels 120 respectively extending between the recess 114 and a locking channel 118. In this way, a retainer sleeve 100 can be guided over the rods 110 such that the four corresponding retaining lugs 116a or 116b slide through a respective guide channel 120 into a locking channel 118. Once the retaining lugs are properly positioned within a respective locking channel 118, the retainer sleeve can be rotated relative to the frame 102 wherein the retaining lugs are no longer aligned with a respective guide channel. Thus, the retainer sleeve 100 is effectively prevented from sliding off, i.e., backing off the frame 100.

Accordingly, an opposing retainer sleeve 100 is similarly positioned so that two retainer sleeves 100 oppose each other on either side of the o-ring 112. With this configuration, the recess 114 of each retainer sleeve 100 fits over the o-ring 112 such that the o-ring 112 is slightly compressed thereby increasing the biasing pressure against the rods 110.

Figure 5:
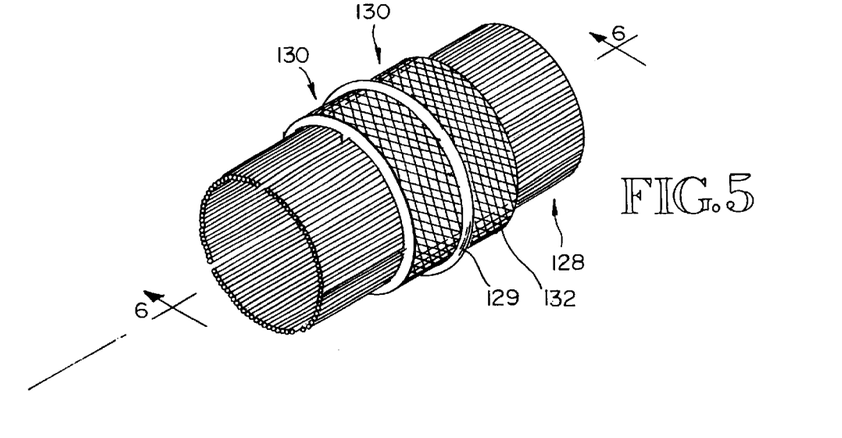
FIG. 5 is a perspective view of an alternate embodiment illustrating a contour gauge having an outer retainer comprising opposing retainer sleeves disposed over a plurality of rods with an o-ring disposed between the opposing retainer sleeves wherein the retainer sleeves are affixed a frame.
Figure 6:
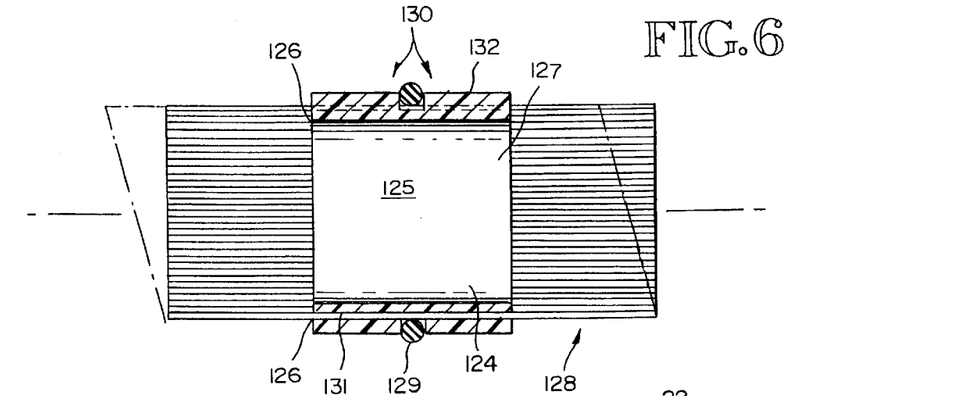
FIG. 6 is a cross-sectional view taken along line 6—6 with phantom lines showing movement of the rods to a position for recording the contour.
Figure 7:
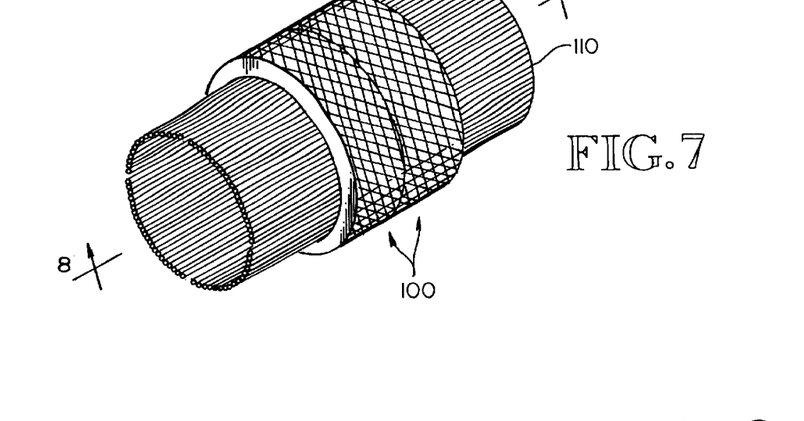
FIG. 7 is a perspective view of an alternate embodiment illustrating an outer retainer comprising opposing removable retainer sleeves.
Figure 8:
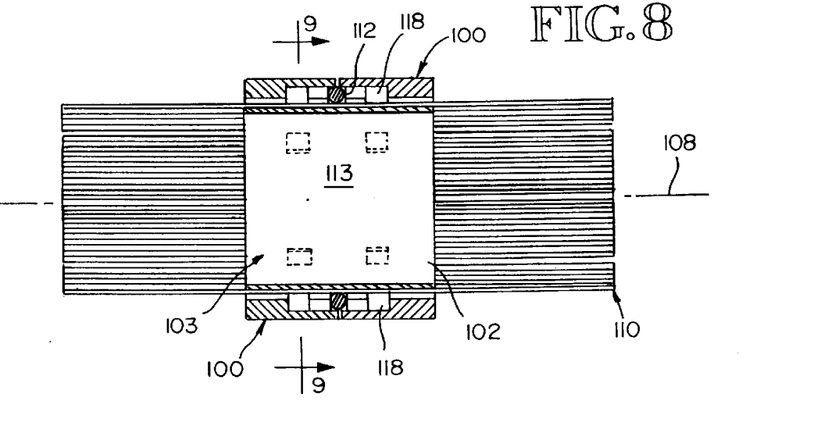
FIG. 8 is a cross-sectional view taken along line 7—7 illustrating the locking channels of the removable retainer sleeves locking against the retaining lugs.
Figure 9:
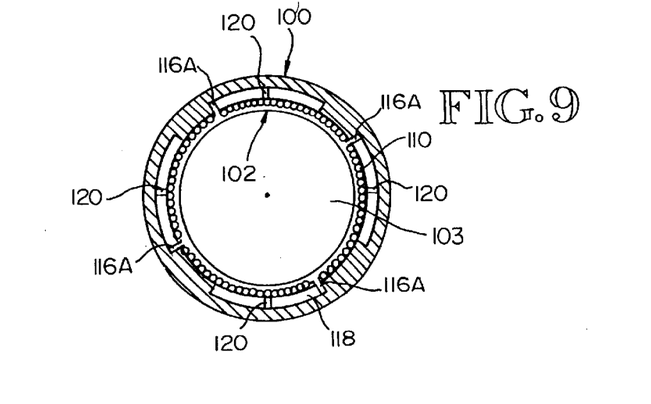
FIG. 9 is a cross-sectional view taken along line 9—9 illustrating the locking channel of the removable retainer sleeves.
Figure 10:
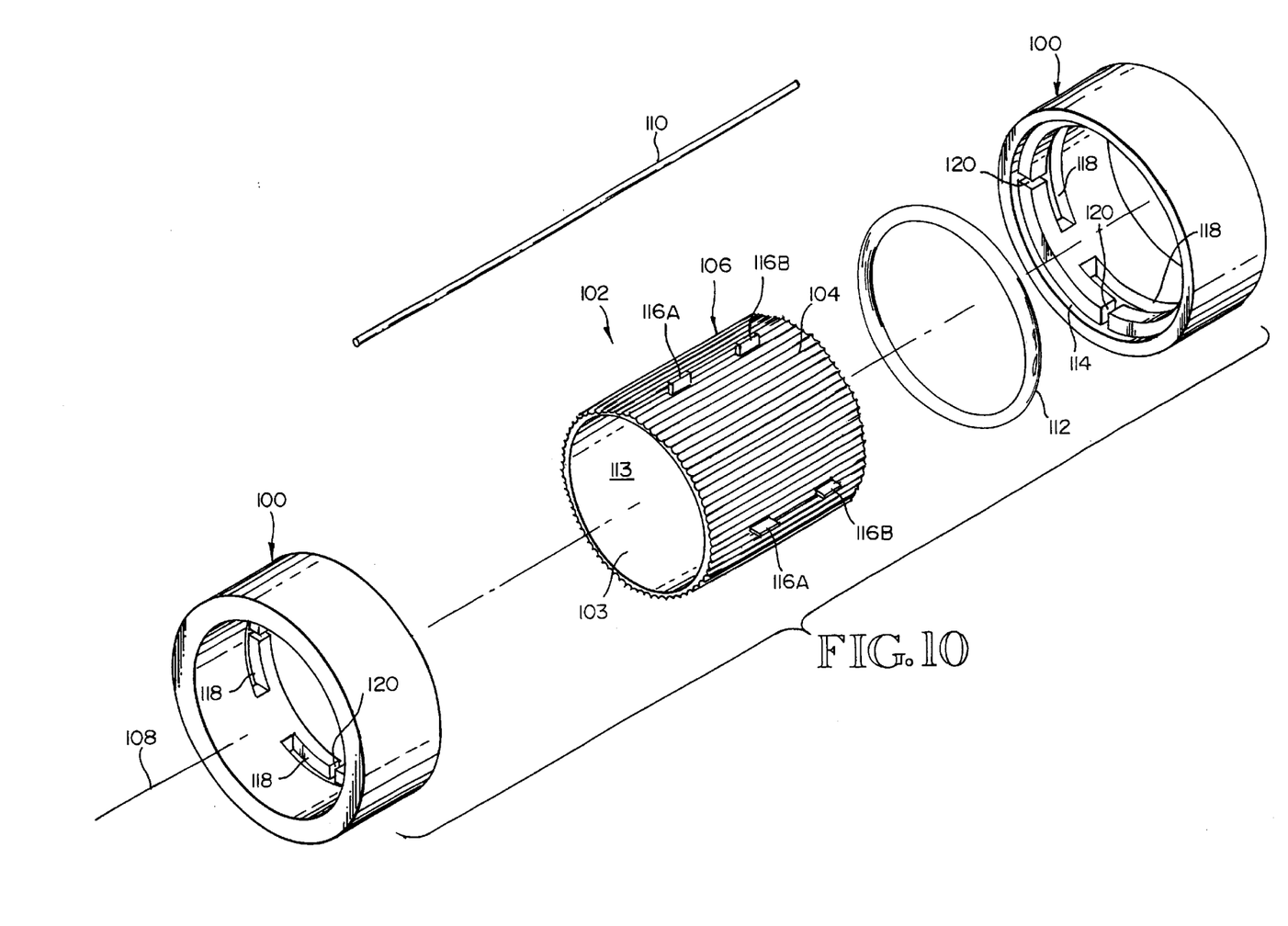
FIG. 10 is an exploded view of an alternate embodiment illustrating an o-ring disposed between opposing removable retainer sleeves having locking channels.

Directing attention to FIGS. 5 and 6 another embodiment is illustrated. Included therein is a cylindrical frame 124 defining a bore 127 and a radially inner surface 125. The frame 124 includes a plurality of grooves 126 disposed to receive a plurality of rods 128 on the outer surface 131 thereof. In this embodiment, however, an outer retainer 132 is defined by a pair of retainer sleeves 130 that are fixed to the frame 124 over the rods 128. The retainer sleeves 130 are so fixed by any conventional manner including lugs (not illustrated) similar to retaining lug 62 illustrated in the preferred embodiment. Moreover, the opposing retainer sleeves 130 are spaced-apart such that an o-ring 129 can be placed therebetween to bias the rods 128 toward grooves 126 of the frame 124.

Regarding to the steps involved in the manufacturing process of a preferred embodiment contour gauge 18, a cylindrical frame 30 is extruded to have a centrally disposed bore 34 that defines a radially inner surface 36 for positioning the frame 30 over a pipe 32 of predetermined size. Similarly, a radially disposed outer surface 38 is formed in the extrusion process and is formed to define a plurality of parallel guide channels 40 disposed side-by-side, extending in a direction parallel to the longitudinal axis 42 of the frame 30.

Then, a biasing member 48, i.e., a pair of o-rings 50 are placed over the frame 30 such that a plurality of elongate rods 46 can be placed thereunder and spread about the radially outer surface 38. In this way, each rod is slidingly received by one of the parallel guide channels 40, the rods 46 being aligned with the longitudinal axis of the frame. Accordingly, the biasing member(s) contact the rods 46 to impart a radially inward directed force on each rod 47 to urge the same against the frame 30, each rod 47 being biased against a respective individual guide channel or groove 45. To maintain the o-rings 50 in position, an outer retainer 54 is then placed over the o-rings 50 and rods 46, and is restricted from movement relative to the frame 30 via engagement with a plurality of retaining lugs 62.

In use, the contour gauge 18 is placed over a pipe 22 with the rods 46 in a neutral position as illustrated in FIG. 6. Then the contour gauge 18 is slidingly moved over the pipe 22 as illustrated in FIG. 4 until the rods 46 engage a transverse pipe 24. Following this, the advancement of the contour gauge 18 is continued until each rod 47 engages the transverse pipe 24. At this point the rods 46 are disposed to define the proper cutting points to form the saddle joint.

Figure 11:
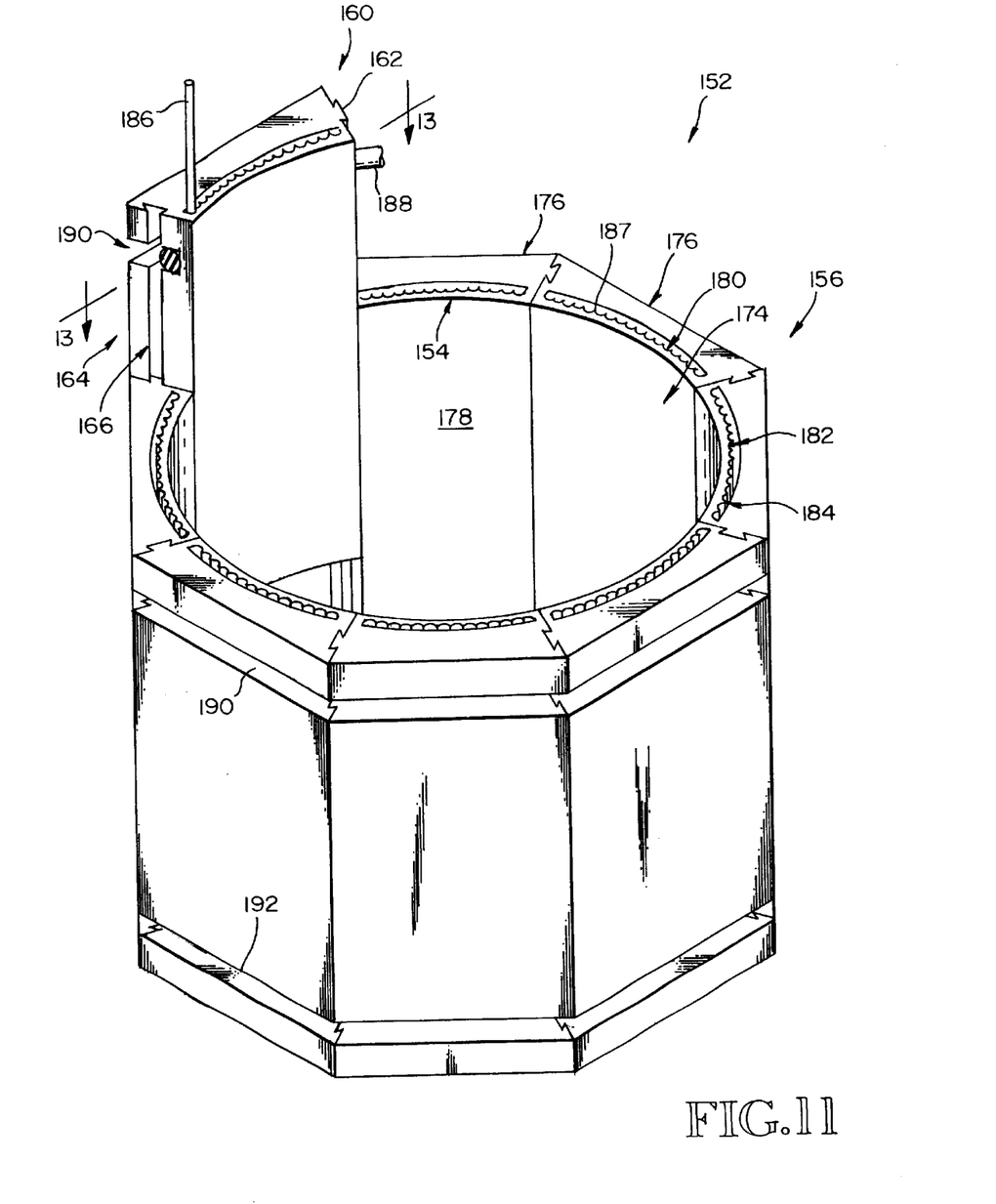
FIG. 11 is an alternate embodiment of the present invention for large diameter pipe where the contour gauge, including the cylindrical frame and integrally formed outer retainer, is constructed with a plurality of interlocking sections that are interlocked to form the frame.
Figure 13:
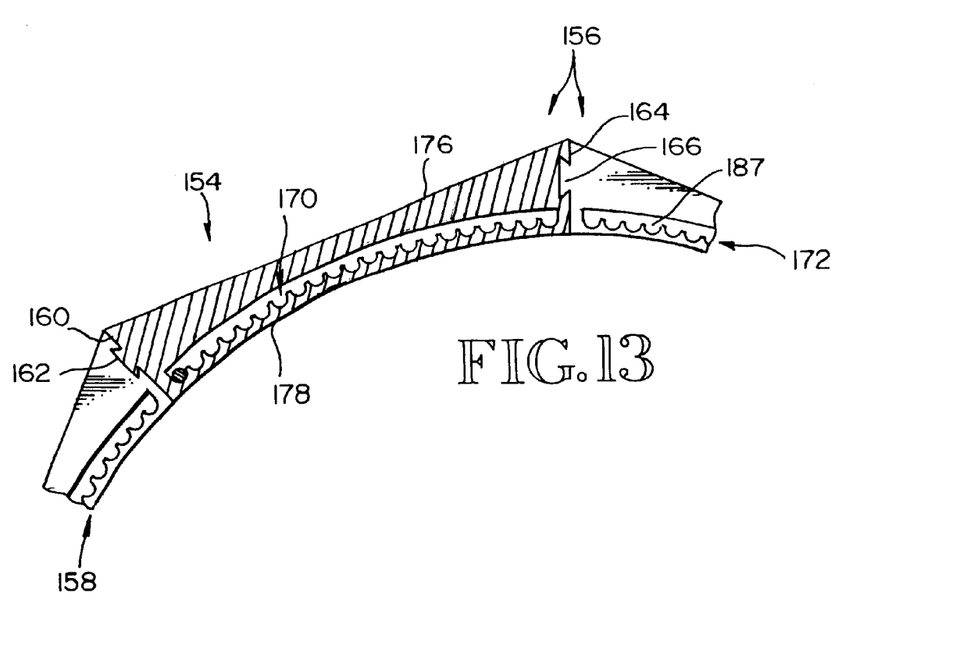
FIG. 13 is a cross-section taken along line 13—13 showing the construction of a interlocking section.

Turning now to FIGS. 11 and 13, an alternate embodiment illustrating a large diameter contour gauge 152 is illustrated. For clarity, only portions thereof are illustrated. Similar to contour gauge 18, the large diameter contour gauge 152 includes a frame 154 that defines a bore 174. However, frame 154 of a large diameter contour gauge 154 comprises a plurality of alike interlocking sections 156 that are designed to be assembled, i.e., linked side-to-side such that a continuous and endless chain of interlocked sections is formed. Accordingly, in a sequence of "mated" sections 156, the last section in the chain mates with the first section. In the preferred embodiment of a large diameter contour gauge 152, eight sections are so linked and interlocked to form a octagon like structure, i.e., frame 154. For this purpose, each alike section 156 includes a male surface 160 that defines a continuous locking post 162, and a female surface 164 that defines a continuous locking channel 166. As best seen in FIG. 11, locking post 162 has the shape of a "dovetail" that one would find in a dovetail joint, whereas the locking channel 166 has an irregular trapezoid-like "dovetail" shape that extends continuously to accommodate and receive the locking post 162 of a male surface 160.

Importantly, it should be understood that a fully assembled large diameter contour gauge 152 includes a frame 154 that is integrally formed with an outer retainer 176. The frame 154 includes a radially disposed inner surface 178 of a diameter to closely fit over a pipe of predetermined size. Likewise, a radially disposed outer surface 180 is provided to define a plurality of parallel guide channels 182 disposed side-by-side to extend in a direction parallel to the longitudinal axis of the frame. Similar to contour gauge 18, guide channels 182 define a plurality of grooves 184 for slidingly receiving one alike rod 186 in each groove. It should be noted that a ridge 187 is formed between each groove 184, and that the ridge 187 projects radially from the outer surface 180, toward the outer retainer 176 to a such that a rod 186 cannot jump from one groove to an adjacent groove because the diameter of a rod 186 is greater than the distance between the ridge 187 and the outer retainer 176.

To bias each rod 186 against the outer surface 180 in its respective groove 184, a biasing member, i.e., o-ring 188 is provided. For this purpose, o-ring channels 190 and 192 are provided. As can be seen, each o-ring channel 190 and 192 is formed by removing a portion of the outer retainer 176 thereby exposing the outer surface 180 and guide channels 182.

Regarding the manufacture of a large diameter contour gauge 152, the frame 154 and outer retainer 176 are integrally formed by extruding each section 156 from aluminum. Accordingly raw sections (not illustrated) are extruded into lengths of approximately 4 feet. The raw sections are then anodized to provide a smooth surface. Following that, individual sections 156 are cut to their approximate length, e.g., 4 inches for a large diameter contour gauge 152 for use with 4 inch diameter pipes.

The individual sections 156 are then assembled by locking adjacent sections 156 together, i.e., the locking post 162 of a male surface 160 is slidingly received into a locking channel 166 of a female surface 164 of an adjacent section 156. Once the frame 154 is assembled, the ends are machined smooth, and the o-ring channels 190 and 192 are machined to expose guide channels 182 thereby facilitating the use of an o-ring to bias the rods against the outer surface 180 into the individual grooves 184.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

That which is claimed is:

1. A saddle joint contour gauge for recording and reproducing the projected line of continuous contact between the end of a first pipe intersecting the side of a transversely disposed second pipe, for configuring the pipes to be accurately cut, and then joined and welded together in end-to-side relationship, the contour gauge comprising:

a cylindrical frame having a plurality of adjacently disposed alike sections that are mated together to form an endless chain of sections, each section having a male surface that defines a locking post and a female surface that defines a locking channel, wherein the plurality of sections are linked together such that the locking post of each section is received by the locking channel of an adjacent section;

the frame defining a bore that extends through the frame about a longitudinal axis, the bore defining a radially disposed inner surface for positioning the frame over a pipe of predetermined size and shape, the frame having a radially disposed outer surface;

the outer surface comprising a plurality of parallel grooves disposed side-by-side to extend in a direction parallel to the longitudinal axis of the frame;

a plurality of elongate rods disposed about the outer surface, said rods being aligned with the longitudinal axis of the frame such that each rod is slidingly received by one of said parallel grooves;

an o-ring disposed around the frame, over the rods, the o-ring contacting said rods to impart a radially inward directed force on each rod to urge the same against the frame, each rod being biased against a respective groove; and an outer retainer disposed around the frame adjacent the o-ring for maintaining the o-ring over the rods.

2. A contour gauge as recited in claim 1 wherein the outer retainer is integrally formed with the frame.

3. A saddle joint contour gauge for recording and reproducing the projected line of continuous contact between the end of a first pipe intersecting the side of a transversely disposed second pipe of larger diameter, for configuring the pipes to be accurately cut, and then joined and welded together in end-to-side relationship, the contour gauge comprising:

a cylindrical frame having a centrally disposed bore defining a radially inner surface for positioning the frame over a pipe of predetermined size, the frame having a radially disposed outer surface;

the outer surface comprising a plurality of parallel guide channels disposed side-by-side to extend in a direction parallel to the longitudinal axis of the frame;

a plurality of elongate rods disposed about the radially outer surface, said rods being aligned with the longitudinal axis of the frame such that each rod is slidingly received by one of said parallel guide channels;

a biasing member circumferentially disposed around the frame, over the rods, the biasing member contacting said rods to impart a radially inward directed force on each rod to urge the same against the frame, each rod being biased against a respective guide channel;

wherein the biasing member comprises an o-ring constructed from elastic material;

an outer retainer for maintaining the o-ring in proper position, the outer retainer being disposed around the cylindrical frame, over the rods; and wherein the outer retainer comprises a pair of opposing retainer sections, the retainer sections having a radially inner surface shaped to fit around the frame such that the retainer sections couple to encircle the frame, the retainer sections having at least one radially disposed groove formed on the inner surface configured to receive the o-ring for maintaining the same in proper position around the rods.

4. A saddle joint contour gauge for recording and reproducing the projected line of continuous contact between the end of a first pipe intersecting the side of a transversely disposed second pipe of larger diameter, for configuring the pipes to be accurately cut, and then joined and welded together in end-to-side relationship, the contour gauge comprising:

a cylindrical frame having a centrally disposed bore defining a radially inner surface for positioning the frame over a pipe of predetermined size, the frame having a radially disposed outer surface;

the outer surface comprising a plurality of parallel guide channels disposed side-by-side to extend in a direction parallel to the longitudinal axis of the frame;

a plurality of elongate rods disposed about the radially outer surface, said rods being aligned with the longitudinal axis of the frame such that each rod is slidingly received by one of said parallel guide channels;

a biasing member circumferentially disposed around the frame, over the rods, the biasing member contacting said rods to impart a radially inward directed force on each rod to urge the same against the frame, each rod being biased against a respective guide channel;

wherein the biasing member comprises at least two spaced o-rings constructed from elastic material;

an outer retainer for maintaining the o-rings in proper position, the outer retainer being disposed around the cylindrical frame, over the rods and over the o-rings; and wherein the outer retainer comprises a pair of opposing retainer sections that encircle the cylindrical frame, the opposing retainer sections having two radially disposed grooves, each groove being configured to receive one o-ring for maintaining the same in proper position around the rods.

5. A saddle joint contour gauge for recording and reproducing the projected line of continuous contact between the end of a first pipe intersecting the side of a transversely disposed second pipe of larger diameter, for configuring the pipes to be accurately cut, and then joined and welded together in end-to-side relationship, the contour gauge comprising:

a cylindrical frame having a centrally disposed bore defining a radially inner surface for positioning the frame over a pipe of predetermined size, the frame having a radially disposed outer surface;

the outer surface comprising a plurality of parallel guide channels disposed side-by-side to extend in a direction parallel to the longitudinal axis of the frame;

a plurality of elongate rods disposed about the radially outer surface, said rods being aligned with the longitudinal axis of the frame such that each rod is slidingly received by one of said parallel guide channels;

a biasing member circumferentially disposed around the frame, over the rods, the biasing member contacting said rods to impart a radially inward directed force on each rod to urge the same against the frame, each rod being biased against a respective guide channel;

wherein the cylindrical frame comprises a plurality of adjacently disposed alike sections that are mated together to form an endless chain of sections, each section having a male surface that defines a locking post and a female surface that defines a locking channel, wherein the plurality of sections are linked together such that the locking post of each section is received by the locking channel of an adjacent section.

6. A contour gauge as recited in claim 5 wherein the biasing member is an o-ring, and the contour gauge further comprises an outer retainer having at least one radially disposed o-ring channel for maintaining the o-ring in proper position over the rods.

7. A saddle joint contour gauge for recording and reproducing the projected line of continuous contact between the end of a first pipe intersecting the side of a transversely disposed second pipe, for configuring the pipes to be accurately cut, and then joined and welded together in end-to-side relationship, the contour gauge comprising:

a cylindrical frame disposed about a bore that extends through the frame, the bore defining a longitudinal axis, the bore defining a radially disposed inner surface for positioning the frame over a pipe of predetermined size and shape, the frame having a radially disposed outer surface;

the outer surface comprising a plurality of parallel grooves disposed side-by-side to extend in a direction parallel to the longitudinal axis of the frame;

a plurality of elongate rods disposed about the outer surface, said rods being aligned with the longitudinal axis of the frame such that each rod is slidingly received by one of said parallel grooves;

an o-ring disposed around the frame, over the rods, the o-ring contacting said rods to impart a radially inward directed force on each rod to urge the same against the frame, each rod being biased against a respective groove;

an outer retainer disposed around the frame over the o-ring for maintaining the o-ring over the rods; and wherein the outer retainer comprises a pair of opposing retainer sections, the retainer sections having a radially inner surface shaped to fit around the frame such that the retainer sections couple to encircle the frame, the retainer sections having at least one radially disposed groove formed on the inner surface configured to receive the o-ring for maintaining the same in proper position around the rods.

8. A saddle joint contour gauge for recording and reproducing the projected line of continuous contact between the end of a first pipe intersecting the side of a transversely disposed second pipe, for configuring the pipes to be accurately cut, and then joined and welded together in end-to-side relationship, the contour gauge comprising:

a cylindrical frame disposed about a bore that extends through the frame, the bore defining a longitudinal axis, the bore defining a radially disposed inner surface for positioning the frame over a pipe of predetermined size and shape, the frame having a radially disposed outer surface;

the outer surface comprising a plurality of parallel grooves disposed side-by-side to extend in a direction parallel to the longitudinal axis of the frame;

a plurality of elongate rods disposed about the outer surface, said rods being aligned with the longitudinal axis of the frame such that each rod is slidingly received by one of said parallel grooves;

an o-ring disposed around the frame, over the rods, the o-ring contacting said rods to impart a radially inward directed force on each rod to urge the same against the frame, each rod being biased against a respective groove;

an outer retainer disposed around the frame over the o-ring for maintaining the o-ring over the rods; and wherein a ridge is defined between each parallel groove, wherein each groove has a portion thereof removed to form a notched ridge to facilitate contact between the o-ring and the rods.

9. A contour gauge as recited in claim 8 further comprising means for preventing relative movement between the frame and the outer retainer.

10. A method for making a saddle joint contour gauge for recording and reproducing the projected line of continuous contact between the end of a first pipe intersecting the side of a transversely disposed second pipe of larger diameter, for configuring the pipes to be accurately cut, and then joined and welded together in end-to-side relationship, the method comprising the steps:

providing a cylindrical frame having a centrally disposed bore that defines a radially inner surface for positioning the frame over a pipe of predetermined size, the frame having a radially disposed outer surface;

forming the outer surface to include a plurality of parallel guide channels disposed side-by-side to extend in a direction parallel to the longitudinal axis of the frame;

placing a plurality of elongate rods about the radially outer surface, said rods being aligned with the longitudinal axis of the frame such that each rod is slidingly received by one of said parallel guide channels;

positioning a biasing member circumferentially around the frame, over the rods, the biasing member contacting said rods to impart a radially inward directed force on each rod to urge the same against the frame, each rod being biased against a respective guide channel;

wherein the biasing member is an o-ring;

placing an outer retainer having an inner surface around the frame for maintaining the o-ring in proper position wherein the inner surface of the outer retainer is adjacently disposed to the outer surface of the frame; and forming a o-ring groove on the inner surface of the outer retainer to receive the o-ring.

* * * * *